United States Patent Office 2,856,441
Patented Oct. 14, 1958

2,856,441
PRODUCTION OF AROMATICS FROM PARAFFINS

Peter B. Murray, Swarthmore, Pa., assignor to Sun Oil Company, Philadelphia, Pa., a corporation of New Jersey No Drawing. Application May 23, 1956
Serial No. 586,635

1 Claim. (Cl. 260—673.5)

This invention relates to a process for catalytically producing aromatics by dehydrocyclization of paraffins in which sulfur dioxide is used as a hydrogen acceptor, and more particularly to a method for reducing catalyst deactivation in such a process.

Processes for the catalytic dehydrogenation and aromatization of various hydrocarbon fractions with the aid of $SO_2$ as a hydrogen acceptor in the presence of catalysts having a dehydrogenation function such as alumina, Fuller's earth, acid activated clays, bentonite, bauxite, silica gel, activated charcoal, and chromia-alumina have been known to the art. Process temperatures range from 900° F. to 1200° F., and pressures of from atmospheric to several hundred pounds may be used. Under these conditions, the $SO_2$ reacts with hydrogen liberated in the dehydrogenation reaction in order to remove it from the reaction mixture, and thus shift the equilibrium towards the production of olefins and aromatics. Another advantage is that the $SO_2$ reacts exothermically and the heat so liberated will counterbalance loss of heat to the endothermic dehydrogenation reaction to maintain the reaction mixture at reaction temperatures. An unavoidable side reaction is cracking and polymerization, which deposits coke on the catalyst and deactivates it. When all the catalyst has been so deactivated, it is necessary to regenerate it by burning the coke off the catalyst.

When conducting the aforesaid reaction as a fixed bed operation, it has been observed that a reaction front having a temperature 50–100° F. higher than other points in the bed slowly travels through the catalyst. Behind this front the catalyst is thoroughly blackened by coke, ahead of it the catalyst is white, the line of demarcation being quite sharp. At the front apparently all the $SO_2$ in the feed is converted. When the front has passed entirely through the catalyst bed, so that all of the catalyst is covered with a carbon deposit, the reaction ceases and the catalyst must be regenerated by burning off the carbon deposit.

I have now found that deactivation by coke formation may be substantially inhibited by including in the feed to the process from about 5 mol percent to about 100 mol percent of ammonia, based on the hydrocarbon content of the feed. The mechanism by which the ammonia inhibits coke formation is not understood, but apparently the ammonia does not affect in any way the dehydrogenation or cyclization functions of the catalyst since about the same percentage of aromatics per pass is formed whether or not ammonia is present in the feed. Since less carbon is formed, the total yield is higher per unit of feed.

As an example of the results obtained by including ammonia in the feed to a dehydrogenation and cyclization process in which $SO_2$ is a component of the feed, the following data is given. In both runs, the hydrocarbon portion of the feed was a $C_6$–$C_7$ fraction obtained as a raffinate from a Udex extraction of a reformate from a process for the manufacture of benzene and toluene from a straight run petroleum fraction by reforming in the presence of a platinum catalyst. This fraction contained about 6% aromatics and about 2% olefins, the balance being almost entirely acyclic paraffins. It had an octane number of about 60, making it undesirable as a blending stock for high octane gasoline.

Table I

| | Run A | Run B |
|---|---|---|
| Catalyst | Alumina | Alumina. |
| LHSV, Feed | 0.5 | 0.5. |
| Molar Ratio, $SO_2$/hydrocarbon | 1:1 | 1:1. |
| Time on stream | 130 min | 120 min. |
| Average Temperature at Reaction Front | 1,021° F | 1,032° F. |
| cc. Hydrocarbons charged | 130 | 125. |
| Mol Ratio $NH_3$/hydrocarbon | 0 | 1:2. |
| Percent Catalyst Deactivated by Carbon | 80 | 40. |
| Percent Carbon on Total Catalyst | 7.82 wt | 5.45 wt. |
| Yield, Vol. Percent | 61 | 63. |
| Percent Aromatics in Product | 22 | 22. |
| Percent Olefins in Product | 5 | 6.5. |

As may be seen from the foregoing, with ammonia present in the feed, ony half as much catalyst was deactivated as was the case when no ammonia was present, enabling the time on stream between regeneration cycles to be doubled. In addition, the liquid recovery was improved, and the product had a higher percentage of olefins, which improves its value as a gasoline blending stock. While in the run given in the table the mol ratio of ammonia to hydrocarbon was 1:2, similar effects are noted with as little as 5 mol percent of ammonia, based on hydrocarbon in the feed. In this case, however, the improvement in catalyst life is not as great. As much as 100 mol percent ammonia can be used, but use of such large quantities usually is not economically desirable, since the slight improvement obtained does not justify the expense of recovering and recycling the added ammonia.

The $SO_2$ to hydrocarbon mol ratio may also be varied over a considerable range, mol ratios of from 1:10 to 2:1 being operable to produce aromatics and olefins from paraffins. While temperatures in the vicinity of 1000° F. are preferred, temperatures of from about 900° F. to about 1200° F. may be used.

I claim:

A process for the dehydrogenation of dehydrogenatable hydrocarbons which comprises passing a feed stock comprising dehydrogenatable hydrocarbons, sulfur dioxide in the amount of 10 mol percent to 200 mol percent, and ammonia in the amount of 5 mol percent to 100 mol percent based on the hydrocarbons, into contact with an alumina catalyst at a temperature of from about 900° F. to about 1200° F., and recovering a hydrocarbon product of greater unsaturation than the feed.

References Cited in the file of this patent
UNITED STATES PATENTS 2,423,418    Stone et al. _____ July 1, 1947

OTHER REFERENCES

Thorpe: "Dictionary of Applied Chemistry," vol. I, p. 199, published by Longmans, Green & Co., London (1921).

Gruse et al.: "Technology of Petroleum," pp. 115–118, published by McGraw-Hill Book Co., Inc., New York (1942).